May 21, 1935.　　　E. L. BARNES　　　2,002,389
REFRIGERATION APPARATUS
Filed Jan. 21, 1931
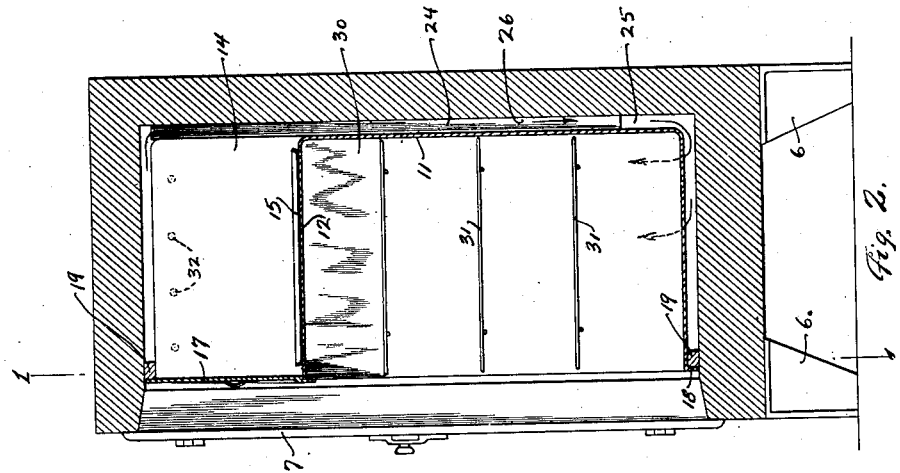
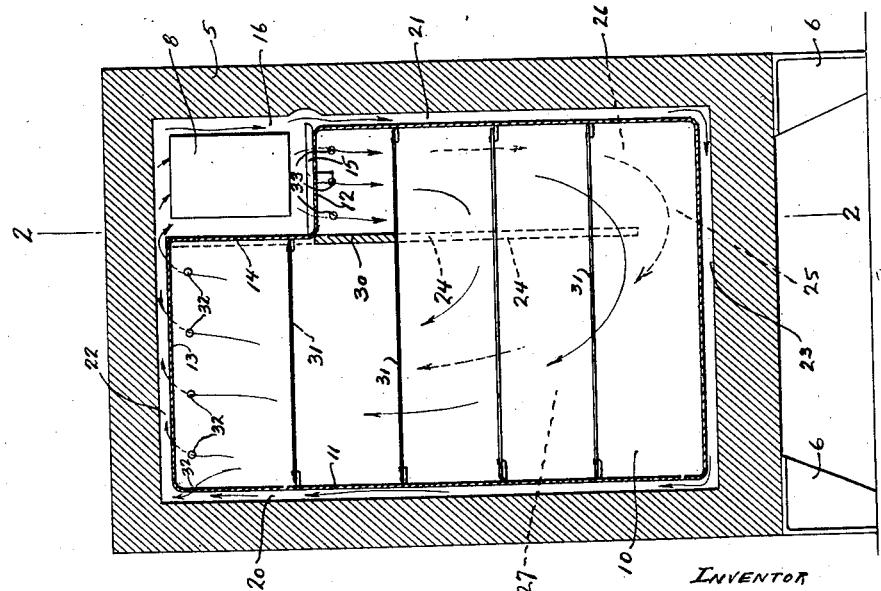
INVENTOR
EUGENE L. BARNES
ATTORNEY Patented May 21, 1935

2,002,389

UNITED STATES PATENT OFFICE 2,002,389

REFRIGERATION APPARATUS

Eugene L. Barnes, Buffalo, N. Y.

Application January 21, 1931, Serial No. 510,138

4 Claims. (Cl. 62—1)

My invention relates generally to refrigeration, and in particular to that type of apparatus adapted for household use.

It is well known to those skilled in the art that in the present type of refrigeration where the cooling unit or boiler is located within the food compartment, the moisture from the air is first condensed and frozen upon the boiler, which makes the air very dry and as a result draws from the vegetables and food contained within the refrigerator the moisture contained within them, so that the vegetables and other food products lose their freshness and become dried out. It is desirable, therefore, to have the food compartment separate from the air conditioning compartment, and to circulate the cold air around the outside of the food compartment walls. When, however, such food compartment is entirely separated and sealed from the air conditioning compartment and is uniformly cooled, condensation forms and adheres to the inner surfaces of the food compartment, which is very undesirable.

I have discovered, however, that if a slight current of air is produced within the food compartment, that it will carry the condensation from the inner walls of the food compartment or prevent its formation thereon.

It has been the principal object of my invention to overcome the disadvantages above pointed out, and to produce a food compartment substantially separated from the air conditioning compartment in which a slight circulation of air shall be produced.

Another object has been to provide a food compartment which shall be cooled by conduction through the walls thereof, as well as by the passage of some air coming from the air conditioning compartment.

Moreover, my device is of such a nature that defrosting of the cooling unit is practically eliminated.

Furthermore, by having an interspaced food compartment, the heat units which leak through the outside walls of the cabinet do not come directly into contact with the casing of the food compartment, but are taken up by the cold air circulating within the space between the casing and cabinet walls.

The above objects and advantages have been accomplished by the device shown in the accompanying drawing, of which:

Fig. 1 is a front, sectional elevation of my complete device, taken on line 1—1 of Fig. 2.

Fig. 2 is a transverse, sectional view thereof, taken on line 2—2 of Fig. 1.

My device comprises a refrigerator cabinet 5, having legs 6 and provided with the customary insulated walls, and a suitable door 7 arranged at the front thereof. In one of the upper corners of the cabinet is the cooling unit or boiler 8 which is shown in conventional manner and which may be one of any number of types or units. This does not form a part of my invention and is, therefore, not shown or described in detail.

Arranged within the cabinet is a food compartment 10 formed by a sheet metal casing 11. The walls of this casing are in interspaced relation with the walls of the cabinet 5 and with the boiler or cooling unit 8, as clearly shown in Fig. 1. The portion 12 of the top of the casing is depressed and connected with the portion 13 of the top by means of the side wall 14, whereby a space 16 is provided for the boiler 8. A pan 15 is supported by the top portion 12 of the casing and is arranged under the boiler. The front of the space 16 is closed preferably by means of a door 17. The food compartment is provided at its forward side with flanges 18 which engage with suitable cleats 19, whereby the casing 11 of the food compartment is suitably held in place and the space around it is closed.

By interspacing the food compartment casing 11 from the inner walls of the cabinet 5, side passageways 20 and 21 are provided, and top and bottom passageways 22 and 23, respectively. A baffle plate 24 is arranged in the space 25 between the back wall of the cabinet and the back wall of the food compartment casing and this extends from a point near the top of the casing to a point near the bottom thereof, whereby passageways 26 and 27 are provided. A baffle plate 30 is located on the inside of the food compartment. The baffle plate extends downwardly a suitable distance starting from the point where the top portion 12 joins the bottom of the side wall 14. Shelves 31 are, of course, provided in the food compartment.

Provided near the top of the food compartment casing are a plurality of relatively small apertures 32 and 33. These openings may be formed in any suitable position in the walls of the casing so long as a circulation of cold air is created within the food compartment. For clearness of illustration I have shown the apertures 32 formed in the back wall of the casing under the top portion 13 and in the side wall of the casing adjacent the passageway 20 and the apertures 33 formed in the back wall under the top portion 12. These openings provide communication between the food compartment and the passageways between this compartment and the walls of the cabinet for the passage of a relatively small amount of air.

From the foregoing, it will be obvious that air currents are produced by the cooling unit or boiler 8 and are forced downwardly through the passageways 26 and 21, some of such air currents passing under the food compartment and through the passageway 23 to the passageway 20, while some of these currents will pass around the lower end of the baffle plate 24 and upwardly through the passageway 27. Some of the relatively cold air will also pass through the openings 33 in the back wall of the casing, under the top portion 12. These air currents, coming into the food compartment, will cause a circulation within this compartment, and these air currents will be deflected downwardly by the baffle 30 toward the bottom of the compartment and then upwardly to the upper portion thereof, passing out through the openings 32 formed in the side wall of the casing adjacent the passageway 20 and also those formed in the back wall of the casing under the top portion 13, where they will join the air currents coming upwardly through the passageways 20 and 27. In the passage of the air currents downwardly around the outside of the casing, the casing walls will be cooled and there will be a temperature interchange by conduction. Likewise the colder air currents coming in through the openings 32 under the portion 12 of the top will tend to reduce the temperature within the food compartment. In addition to the cooling effect of these air currents coming through the openings just described, the air which is thereby set in circulation will sweep substantially all condensation which may occur on the inside walls of the casing 11 of the food compartment or prevent the formation of such condensation thereon. A portion of the moist air resulting from such passage will be taken out of the openings 32 located below the top portion 13 of the food compartment, but not enough moisture will be removed to cause the undesirable dehydration of the food contained within the refrigerator.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. An iceless refrigerating apparatus, comprising a refrigerating cabinet, a food compartment arranged within the cabinet and in interspaced relation therewith, a cooling unit separate from the food compartment and in free communication with the space between the cabinet and the food compartment, the food compartment being provided with relatively small inlet openings arranged below the cooling unit, and also with relatively small outlet openings arranged in the upper portion of the food compartment and in line with the upper portion of the cooling unit.

2. An iceless refrigerating apparatus, comprising a refrigerating cabinet, a food compartment arranged within the cabinet and in interspaced relation therewith, a cooling unit separate from the food compartment and in free communication with the space between the cabinet and the food compartment, the food compartment being provided with relatively small inlet openings arranged below the cooling unit, and also with relatively small outlet openings arranged in the upper portion of the food compartment and in line with the upper portion of the cooling unit, and a baffle plate arranged in one of the spaces between the cabinet and food compartment, said baffle plate being arranged between the inlet and outlet openings and extending from a point near the top of the cabinet to a point near the bottom thereof.

3. An iceless refrigerating apparatus, comprising a refrigerating cabinet, a food compartment arranged within the cabinet and in interspaced relation therewith, a cooling unit separate from the food compartment and in free communication with the space between the cabinet and the food compartment, the food compartment being provided with relatively small inlet openings arranged below the cooling unit, and also with relatively small outlet openings arranged in the upper portion of the food compartment and in line with the upper portion of the cooling unit, and baffle means located within the food compartment and disposed between the inlet and outlet openings thereof.

4. An iceless refrigerating apparatus, comprising a refrigerating cabinet, a food compartment arranged within the cabinet and in interspaced relation therewith, a cooling unit separate from the food compartment and in free communication with the space between the cabinet and the food compartment, the food compartment being provided with relatively small inlet openings arranged below the cooling unit, and also with relatively small outlet openings arranged in the upper portion of the food compartment and in line with the upper portion of the cooling unit, a baffle plate arranged in one of the spaces between the cabinet and the food compartment, said baffle plate being arranged between the inlet and outlet openings and extending from a point near the top of the cabinet to a point near the bottom thereof, and baffle means located within the food compartment and disposed between the inlet and outlet openings thereof.

EUGENE L. BARNES.